United States Patent
Fukuzawa (10) Patent No.: US 12,432,068 B2
(45) Date of Patent: Sep. 30, 2025

(54) COMMUNICATION SYSTEM AND RECEIVING DEVICE

(71) Applicant: TOYOTA JIDOSHA KABUSHIKI KAISHA, Toyota (JP)

(72) Inventor: Teppei Fukuzawa, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 192 days.

(21) Appl. No.: 18/490,824

(22) Filed: Oct. 20, 2023

(65) Prior Publication Data
US 2024/0163109 A1    May 16, 2024

(30) Foreign Application Priority Data
Nov. 11, 2022 (JP) .................. 2022-180951

(51) Int. Cl.
*H04L 29/06* (2006.01)
*H04L 9/32* (2006.01)
*H04L 9/40* (2022.01)

(52) U.S. Cl.
CPC ........ *H04L 9/3242* (2013.01); *H04L 63/123* (2013.01)

(58) Field of Classification Search
None
See application file for complete search history.

(56) References Cited

U.S. PATENT DOCUMENTS

| | | | |
|---|---|---|---|
| 8,281,151 B2 * | 10/2012 | Shah | H04L 9/3221 711/216 |
| 2019/0354723 A1 * | 11/2019 | Dassenno | H04L 9/3242 |

FOREIGN PATENT DOCUMENTS

| | | | | |
|---|---|---|---|---|
| DE | 112010005474 T5 * | 1/2013 | | H04L 67/51 |
| JP | 2016129339 A | 7/2016 | | |

* cited by examiner

*Primary Examiner* — Andrew J Steinle
(74) *Attorney, Agent, or Firm* — Dickinson Wright, PLLC (57) ABSTRACT

A communication system includes a transmitting device group and a receiving device configured to receive data sets. The receiving device is configured to determine reliabilities of the received data sets and manage assignment rates of message authentication codes, which are set for respective types of data sets. The transmitting device group is configured to generate message authentication codes for data sets, and transmit data sets after assigning the generated message authentication codes to the data sets at assignment rates. The receiving device is configured to change, when it is determined that the reliability of a first data set has been reduced, the assignment rate for the first data set to a value greater than that before the change and change the assignment rate for a second data set, which is of a type different from the first data set, to a value less than that before the change.

7 Claims, 7 Drawing Sheets

COMMUNICATION SYSTEM AND RECEIVING DEVICE

BACKGROUND

1. Field

The present disclosure relates to a communication system and a receiving device.

2. Description of Related Art

Japanese Laid-Open Patent Publication No. 2016-129339 discloses a communication system. The communication system includes a transmitting device and a receiving device. The transmitting device generates message authentication codes for data sets to be transmitted. The transmitting device transmits the data sets to the receiving device after assigning the generated message authentication codes to the data sets. The transmitting device neither generates message authentication codes for nor assign message authentication codes to some of the data sets to be transmitted.

In the communication system disclosed in the above publication, the processing load on the transmitting device and the receiving device is increased by the amount corresponding the generation of the message authentication codes by the transmitting device. In contrast, as the data sets for which the transmitting device does not generate message authentication codes increase, the receiving device is more likely to be affected by falsification of data by external devices or the like.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a communication system includes a transmitting device group that includes one or more transmitting devices configured to repeatedly transmit data sets, and a receiving device configured to receive multiple types of data sets. The receiving device is configured to receive the data sets transmitted from the one or more transmitting devices, determine reliabilities of the received data sets, manage assignment rates of message authentication codes for the data sets, the assignment rates being determined for respective types of the data sets, and transmit information indicating the assignment rates. The transmitting device group is configured to receive the information indicating the assignment rates, generate, for each of the types of the data sets, the message authentication code at the assignment rate corresponding to each of the types of the data sets, and transmit the data sets after assigning the generated message authentication codes to the data sets at the assignment rates corresponding to the types of the data sets. The data sets include a first data set and a second data set that is of a different type from the first data set. The receiving device is configured to change, when it is determined that the reliability of the first data set has been reduced, the assignment rate for the first data set to a value greater than that before the change and change the assignment rate for the second data set to a value less than that before the change.

In another general aspect, a receiving device is configured to receive multiple types of data sets from a transmitting device group that includes one or more transmitting devices configured to repeatedly transmit data sets. The receiving device being configured to receive the data sets transmitted from the one or more transmitting devices, determine reliabilities of the received data sets, manage assignment rates of message authentication codes for the data sets, the assignment rates being determined for respective types of the data sets, and transmit information indicating the assignment rates. The data sets include a first data set and a second data set that is of a different type from the first data set. The receiving device is configured to change, when it is determined that the reliability of the first data set has been reduced, the assignment rate for the first data set to a value greater than that before the change and change the assignment rate for the second data set to a value less than that before the change.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Embodiment

A communication system according to an embodiment will now be described with reference to the drawings. A vehicle including the communication system will now be described.

Outline of Communication System of Vehicle

Figure 1:
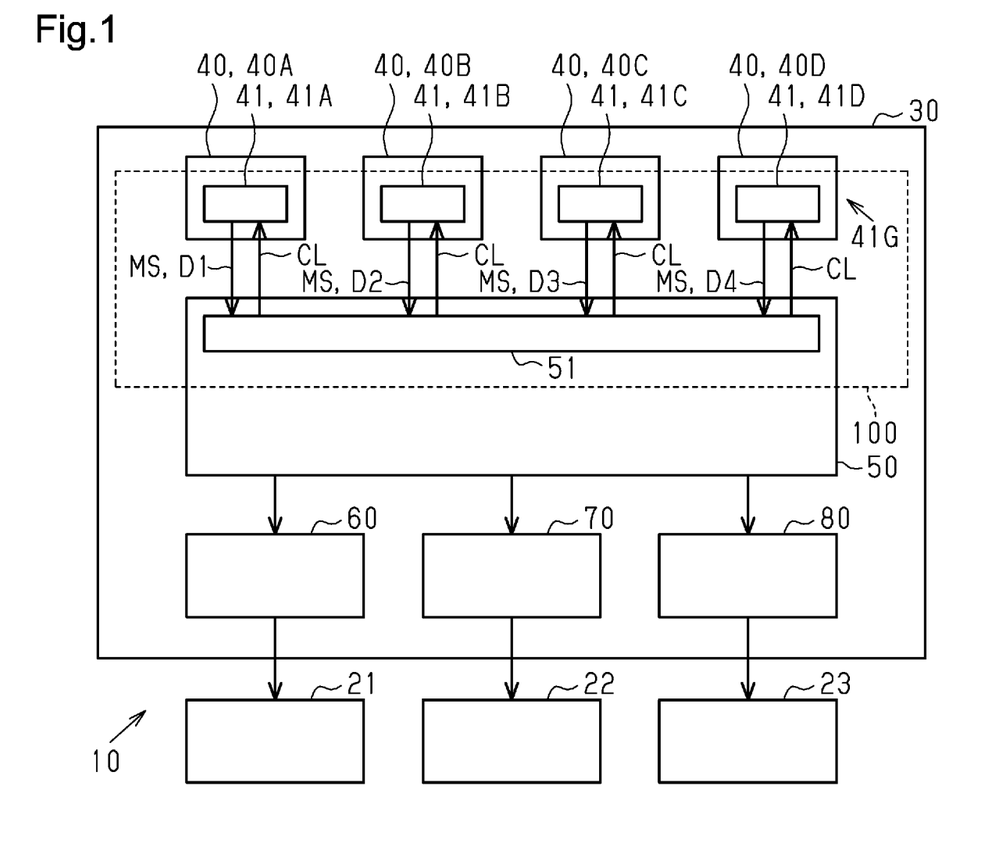
FIG. 1 is a schematic diagram showing a communication system of a vehicle.

As shown in FIG. 1, a vehicle 10 includes an internal combustion engine 21, a steering device 22, brake devices 23, and a control system 30.

The internal combustion engine 21 is a drive source of the vehicle 10. The internal combustion engine 21 includes multiple actuators (not shown) such as a throttle valve, fuel injection valves, and ignition devices. The internal combustion engine 21 controls the actuators by using the control system 30, thereby burning fuel to generate a driving force of the vehicle 10.

The steering device 22 changes the steered angle of the steered wheels of the vehicle 10. The steering device 22 includes an electric power steering. In the electric power steering, the control system 30 controls the actuator to finely adjust the operation amount of the steering wheel by the driver or adjust the steered angle regardless of the operation by the driver.

The brake devices 23 generate braking force in the vehicle 10. Each brake device 23 is a disc brake that uses hydraulic pressure to generate braking force. Although not illustrated, each brake device 23 includes a disc, a brake pad, and an actuator that applies hydraulic pressure to the brake pad. When the actuator of the brake device 23 is controlled by the control system 30, the brake pad contacts the disc. As a result, the brake device 23 generates braking force in the vehicle 10.

The control system 30 includes sensor ECUs 40, an advanced safety ECU 50, an engine ECU 60, a steering ECU 70, and a brake ECU 80. The ECUs are capable of sending and receiving signals to and from each other through an internal bus (not shown).

Each sensor ECU 40 obtains a detection value detected by a sensor (not shown). Each sensor ECU 40 includes a transmitting device 41. The transmitting device 41 transmits a data set D, which is based on the obtained detection value, to the advanced safety ECU 50.

Specifically, the control system 30 includes first to fourth sensor ECUs 40A to 40D as the sensor ECUs 40. The first sensor ECU 40A includes a first transmitting device 41A as the transmitting device 41. The second sensor ECU 40B includes a second transmitting device 41B as the transmitting device 41. The third sensor ECU 40C includes a third transmitting device 41C as the transmitting device 41. The fourth sensor ECU 40D includes a fourth transmitting device 41D as the transmitting device 41.

The first sensor ECU 40A obtains, as a detection value, a video from a camera that captures a video of the right side of the vehicle 10. The first transmitting device 41A of the first sensor ECU 40A transmits a first data set D1, which is based on the video from the camera, to the advanced safety ECU 50. The second sensor ECU 40B obtains, as a detection value, a video from a camera that captures a video of the front side of the vehicle 10. The second transmitting device 41B of the second sensor ECU 40B transmits a second data set D2, which is based on the video from the camera, to the advanced safety ECU 50. The third sensor ECU 40C obtains, as a detection value, a video from a camera that captures a video of the left side of the vehicle 10. The third transmitting device 41C of the third sensor ECU 40C transmits a third data set D3, which is based on the video from the camera, to the advanced safety ECU 50. The fourth sensor ECU 40D obtains, as a detection value, map data received by the wireless receiver. Then, the fourth transmitting device 41D of the fourth sensor ECU 40D transmits a fourth data set D4, which is based on the map data from the wireless receiver, to the advanced safety ECU 50. The wireless receiver described above, for example, performs wireless communication with a map server to receive map data from the map server. The sensor ECUs 40 are not limited to ones that obtain detection values from cameras or wireless receivers. For example, the sensor ECU 40 may obtain detection values from millimeter wave radars or through light detection and ranging (LiDAR).

The advanced safety ECU 50 has functions related to driver assistance of the vehicle 10. Specifically, the advanced safety ECU 50 includes a CPU and a ROM. The ROM stores applications. Each application is a program to implement functions of the advanced driver assist system. An example of the applications is an adaptive cruise control (ACC) application used to follow the preceding vehicle while maintaining a constant distance from the preceding vehicle. The ACC application outputs an acceleration request to each of the actuators mounted on the vehicle 10 such that the vehicle 10 travels while maintaining a certain distance from the preceding vehicle.

Another example of the applications is a lane keeping assist (LKA) application that ensures the vehicle 10 stays in the current lane. Further, another example of the applications is an application that causes the vehicle 10 to avoid an obstacle.

The advanced safety ECU 50 includes a receiving device 51. The receiving device 51 obtains data sets D from the sensor ECUs 40. The advanced safety ECU 50 executes each application using the obtained data sets D. When the CPU of the advanced safety ECU 50 executes each application, the CPU outputs motion requests corresponding to that application so as to implement functions of the application.

The CPU of the advanced safety ECU 50 outputs the motion requests to ECUs controlling the actuators that need to be controlled to implement the functions of the corresponding application. Specifically, the CPU of the advanced safety ECU 50 outputs motion requests to one or more ECUs selected from the engine ECU 60, the steering ECU 70, and the brake ECU 80.

When receiving a motion request, the engine ECU 60 controls the actuators of the internal combustion engine 21 so as to perform a requested motion. Specifically, the engine ECU 60 controls the actuators of the internal combustion engine 21 so as to achieve a requested acceleration.

When receiving a motion request, the steering ECU 70 controls the actuators of the steering device 22 so as to perform a requested motion. Specifically, the steering ECU 70 controls the actuators of the steering device 22 to achieve a requested steered angle.

When receiving a motion request, the brake ECU 80 controls the actuators of the brake devices 23 so as to perform a requested motion. Specifically, the brake ECU 80 controls the actuators of the brake devices 23 so as to achieve a requested acceleration.

Communication System

The vehicle 10 includes a communication system 100. The communication system 100 includes the receiving device 51 and a transmitting device group 41G, which includes the first to fourth transmitting devices 41A to 41D. When there is no need to distinguish between the first to fourth transmitting devices 41A to 41D, the first to fourth transmitting devices 41A to 41D may be collectively referred to as the transmitting devices 41.

Each transmitting device 41 repeatedly transmits, to the receiving device 51, a message MS including the data set D based on the detection value detected by the corresponding sensor. Specifically, the first transmitting device 41A transmits a message MS including the first data set D1. The second transmitting device 41B transmits a message MS including the second data set D2. The third transmitting device 41C transmits a message MS including the third data set D3. The fourth transmitting device 41D transmits a message MS including the fourth data set D4. Accordingly, the transmitting device group 41G repeatedly transmits multiple types of messages MS to the receiving device 51. The receiving device 51 receives the messages MS from the respective transmitting devices 41.

Figure 2:
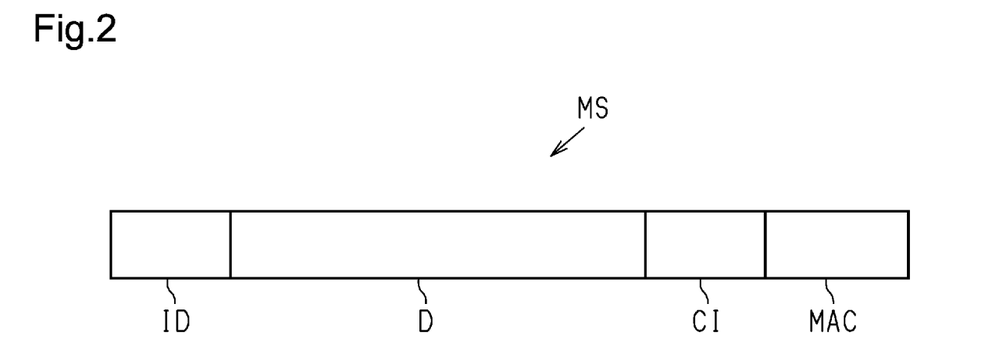
FIG. 2 is an explanatory diagram showing the configuration of a data set transmitted and received in the communication system shown in FIG. 1.

As shown in FIG. 2, each message MS includes a type number ID, a data set D, and counter information CI. Some of the messages MS further include a message authentication code MAC. That is, message authentication codes MAC are assigned to some data sets D.

The type number ID is information indicating the type of the data set D. For example, when the type number ID is 1, the type number ID indicates that the data set D included in the message MS is the first data set D1, which is based on the detection value of the camera that acquires a video of the right side of the vehicle 10. When the type number ID is 2, the type number ID indicates that the data set D included in the message MS is the second data set D2, which is based on the detection value of the camera that acquires a video of the front side of the vehicle 10. When the type number ID is 3, the type number ID indicates that the data set D included in the message MS is the third data set D3, which is based on the detection value of the camera that acquires a video of the left side of the vehicle 10. When the type number ID is 4, the type number ID indicates that the data set D included in the message MS is the fourth data set D4, which represents map data of the surroundings of the vehicle 10. Thus, data sets D with different type numbers ID are different types of data sets D.

A data set D is a data body to be transmitted which is included in a message MS, that is, a payload. For example, the data set D to which 1 is assigned as the type number ID is image information indicating the road and the buildings near the vehicle 10, which are detected by the camera that acquires a video of the right side of the vehicle 10. Further, for example, the data set D to which 4 is assigned as the type number ID is image information indicating map information of the surroundings of the vehicle 10.

The counter information CI indicates the number of times the message MS of the same type number ID has been transmitted. For example, the counter information CI is reset when the power of the vehicle 10 is turned off. The counter information CI is a numerical value that increases by one each time a message MS of the same type number ID is transmitted after the power of the vehicle 10 is turned on.

The message authentication code MAC is a code assigned to a data set D when the data set D is encrypted. The message authentication code MAC is generated by the transmitting device 41. When a message authentication code MAC generated by the receiving device 51 agrees with the message authentication code MAC of a received message MS, the receiving device 51 authenticates the message MS as being valid. When a message authentication code MAC generated by the receiving device 51 does not agree with the message authentication code MAC of a received message MS, the receiving device 51 does not authenticate the message MS and treats the message MS as an invalid message MS.

Figure 3:
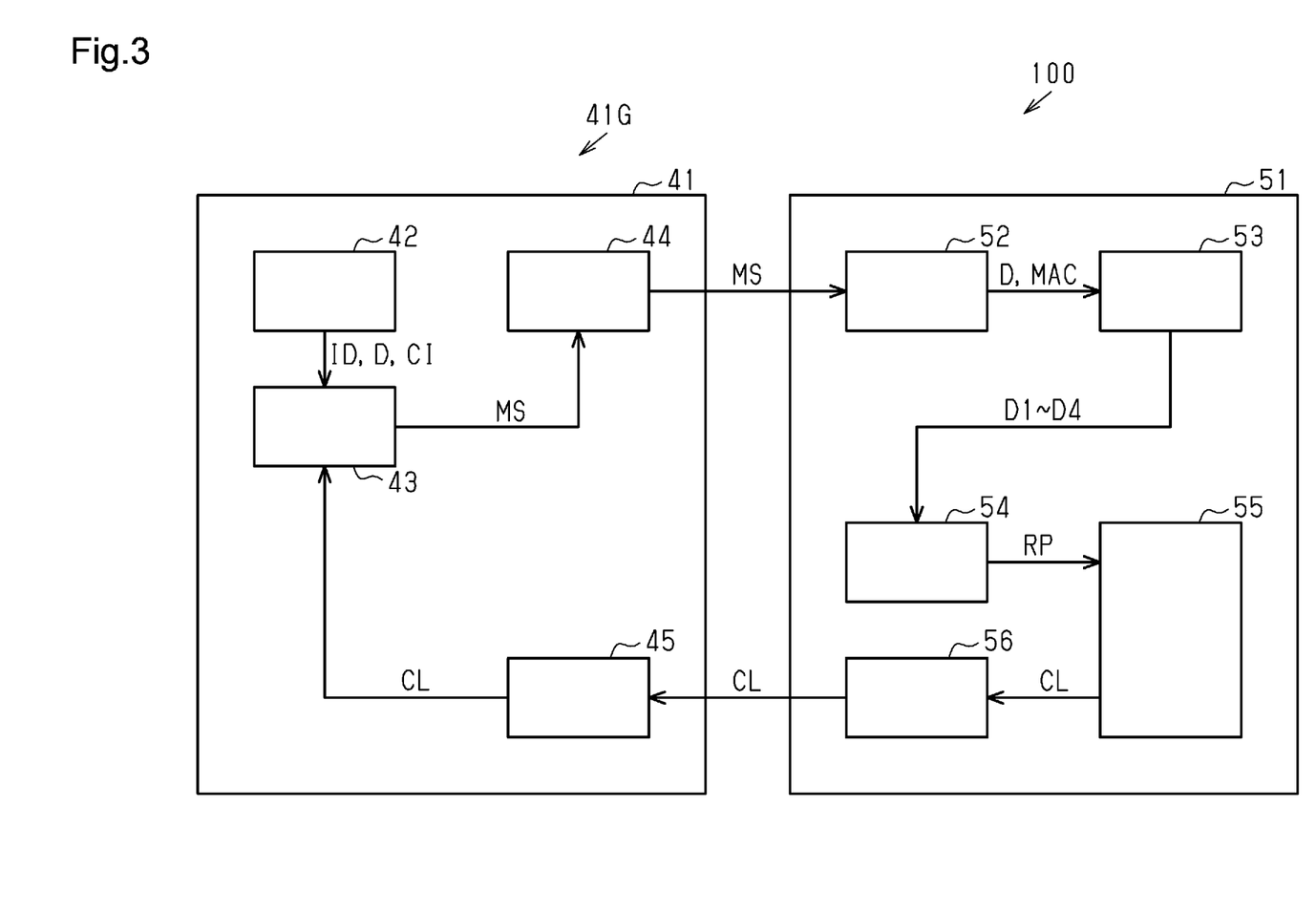
FIG. 3 is a schematic diagram showing functional units of the communication system shown in FIG. 1.

As shown in FIG. 3, the transmitting device 41 includes a message body generating unit 42, a MAC generating unit 43, a message transmitting unit 44, and an information receiving unit 45. Although not illustrated, the transmitting device 41 includes a CPU, a ROM, and a storage device. The CPU of the transmitting device 41 executes programs stored in the ROM.

The storage device of the transmitting device 41 stores list data indicating whether message authentication codes MAC are necessary. In the list indicated by the list data, the necessity of the message authentication code MAC is associated with each type number ID of data sets D. The storage device of the transmitting device 41 stores a cryptographic key.

The receiving device 51 transmits a code assignment list CL as information indicating assignment rates GR. An assignment rate GR is a value that indicates the ratio of the messages MS in which a message authentication code MAC is assigned to the data set D. The code assignment list CL indicates to which data sets D message authentication codes MAC should be assigned among the data sets D that are repeatedly transmitted from the transmitting device 41. The code assignment list CL specifies, when the transmitting device 41 sequentially transmits N messages MS, to which message's data set D (based on the order within the N messages) a message authentication code MAC should be assigned. In other words, the time at which a message authentication code MAC should be assigned to the data set D is specified. In the code assignment list CL, the ratio of the data sets D to which the message authentication codes MAC should be assigned agrees with the assignment rate GR. The code assignment list CL is generated for each type of the data sets D. That is, the receiving device 51 generates one code assignment list CL for each of the first to fourth data sets D1 to D4 and then transmits the generated code assignment lists CL. The code assignment lists CL transmitted by the receiving device 51 are received by the transmitting devices 41.

As shown in FIG. 3, the receiving device 51 includes a message receiving unit 52, a MAC verifying unit 53, a reliability determining unit 54, an assignment rate managing unit 55, and an information transmitting unit 56. Although not illustrated, the receiving device 51 includes a CPU, a ROM, and a storage device. The CPU of the receiving device 51 executes programs stored in the ROM.

The storage device of the receiving device 51 stores list data indicating whether message authentication codes MAC are necessary. In the list indicated by the list data, the necessity of verification of message authentication codes MAC is associated with each type number ID of the data sets D. The list data stored in the receiving device 51 has the same contents as the list data stored in the transmitting device 41. The memory device of the receiving device 51 stores the same cryptographic key as the cryptographic key stored in the storage device of the transmitting device 41. The storage device of the receiving device 51 stores a code assignment list CL.

Generation of Message Body

The CPU of the transmitting device 41 implements the message body generating unit 42 by executing a program for generating message bodies stored in the ROM. The CPU of the transmitting device 41 executes the program at a preset transmission cycle for each target message MS. The transmission cycle may be a predetermined fixed cycle or a cycle at which detection values are obtained from sensors. When the CPU of the transmitting device 41 executes the program, the message body generating unit 42 obtains detection values detected by sensors and generates a data set D based on the detection value. Also, the message body generating unit 42 calculates the type number ID corresponding to the generated data set D. Further, the message body generating unit 42 calculates the counter information CI of the message MS to be transmitted. Then, the message body generating unit 42 generates a message body of the message MS, to which no message authentication code MAC is assigned. A message body includes a data set D, a type number ID, and counter information CI. The message body generating unit 42 outputs the message body to the MAC generating unit 43.

Reception of Information Indicating Assignment Rate

The CPU of the transmitting device 41 implements the information receiving unit 45 by executing a program for receiving information indicating assignment rates GR stored in the ROM. The CPU of the transmitting device 41 receives the code assignment list CL from the receiving device 51. Then, the information receiving unit 45 stores the received code assignment list CL in the storage device of the transmitting device 41.

Generation of MACs

The CPU of the transmitting device 41 implements a MAC generating unit 43 by executing a program for generating MACs stored in the ROM. Specifically, each time a message body is generated by the message body generating unit 42, the CPU of the transmitting device 41 executes the program.

Figure 4:
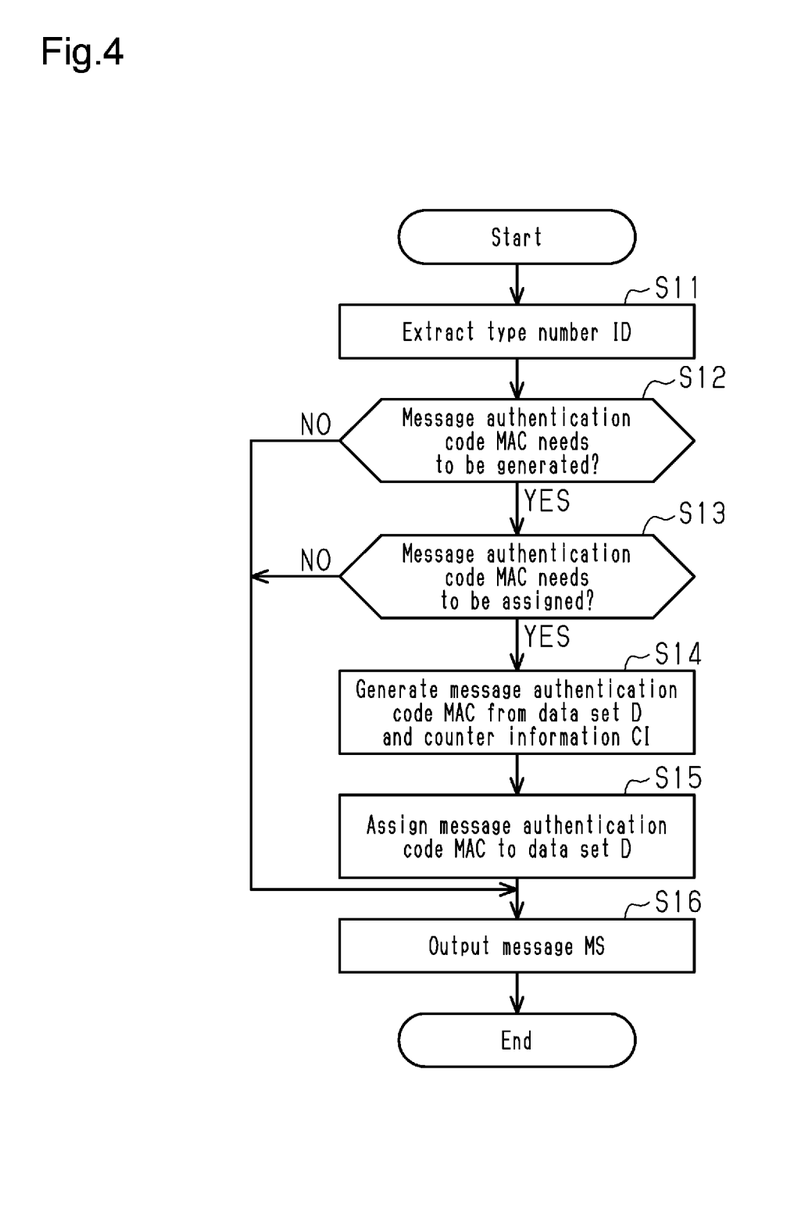
FIG. 4 is a flowchart showing a series of processes related to MAC generation by the transmitting device shown in FIG. 3.

As shown in FIG. 4, when the program for generating MACs is executed, the MAC generating unit 43 first executes the process of step S11. In step S11, the MAC generating unit 43 extracts the type number ID of a message body input from the message body generating unit 42. Subsequently, the MAC generating unit 43 advances the process to step S12.

In step S12, the MAC generating unit 43 determines whether a message authentication code MAC needs to be generated for the type of the current message body. Specifically, the MAC generating unit 43 compares the type number ID extracted in step S11 with the list data, which is stored in the storage device and indicates whether a message authentication code MAC is necessary. If the list indicated by the list data indicates that a message authentication code MAC is necessary for the type number ID obtained in step S11, the MAC generating unit 43 determines that a message authentication code MAC needs to be generated. If the list indicated by the list data indicates that a message authentication code MAC is not necessary for the type number ID obtained in step S11, the MAC generating unit 43 determines that a message authentication code MAC does not need to be generated. When determining that a message authentication code MAC needs to be generated (S12: YES), the MAC generating unit 43 advances the process to step S13.

In step S13, the MAC generating unit 43 determines whether a message authentication code MAC should be assigned to the current message body. Specifically, the MAC generating unit 43 refers to the code assignment list CL stored in the storage device. Next, the MAC generating unit 43 determines whether the message MS, intended for transmission this time, corresponds to the appropriate numbered message in the code assignment list CL for which a message authentication code MAC should be assigned. When the determination is affirmative (S13: YES), the MAC generating unit 43 advances the process to step S14.

In step S14, the MAC generating unit 43 generates a message authentication code MAC. For example, the MAC generating unit 43 generates a hash value using a hash function from the data set D and the counter information CI of the current message body. Then, the MAC generating unit 43 generates a message authentication code MAC from the hash value using an encryption algorithm indicated by the cryptographic key. Subsequently, the MAC generating unit 43 advances the process to step S15.

In step S15, the MAC generating unit 43 assigns the generated message authentication code MAC to the message body. The MAC generating unit 43 thus stores the generated message authentication code MAC in the message MS storing the message body, thereby generating a message MS. Subsequently, the MAC generating unit 43 advances the process to step S16.

In step S16, the MAC generating unit 43 outputs the generated message MS to the message transmitting unit 44. Then, the MAC generating unit 43 terminates the current series of processes.

When determining that a message authentication code MAC does not need to be generated (S12: NO), the MAC generating unit 43 advances the process to step S16. When determining that the currently treated message body is not a message body to which a message authentication code MAC should be assigned (S13: NO), the MAC generating unit 43 advances the process to step S16. In this manner, when a negative determination is made in step S12 or step S13 and the process reaches step S16, the message body is not assigned a message authentication code MAC. In this case, in step S16, the MAC generating unit 43 directly outputs, as the message MS, the message body to which the message authentication code MAC is not assigned to the message transmitting unit 44. Then, the MAC generating unit 43 terminates the current series of processes.

Transmission of Message

As shown in FIG. 3, the CPU of the transmitting device 41 implements the message transmitting unit 44 by executing a program for transmitting messages stored in the ROM.

The CPU of the transmitting device 41 executes the program each time it receives a message MS from the MAC generating unit 43. Thus, the message transmitting unit 44 repeatedly transmits message MS to the receiving device 51.

Reception of Message

The CPU of the receiving device 51 implements the message receiving unit 52 by executing a program for receiving messages stored in the ROM. The message receiving unit 52 receives messages MS transmitted from the transmitting devices 41. Then, the message receiving unit 52 outputs the received messages MS to the MAC verifying unit 53.

Verification of MAC

The CPU of the receiving device 51 implements the MAC verifying unit 53 by executing a program for verifying MACs stored in the ROM. Specifically, the CPU of the receiving device 51 executes the program each time it obtains a message MS from the message receiving unit 52.

Figure 5:
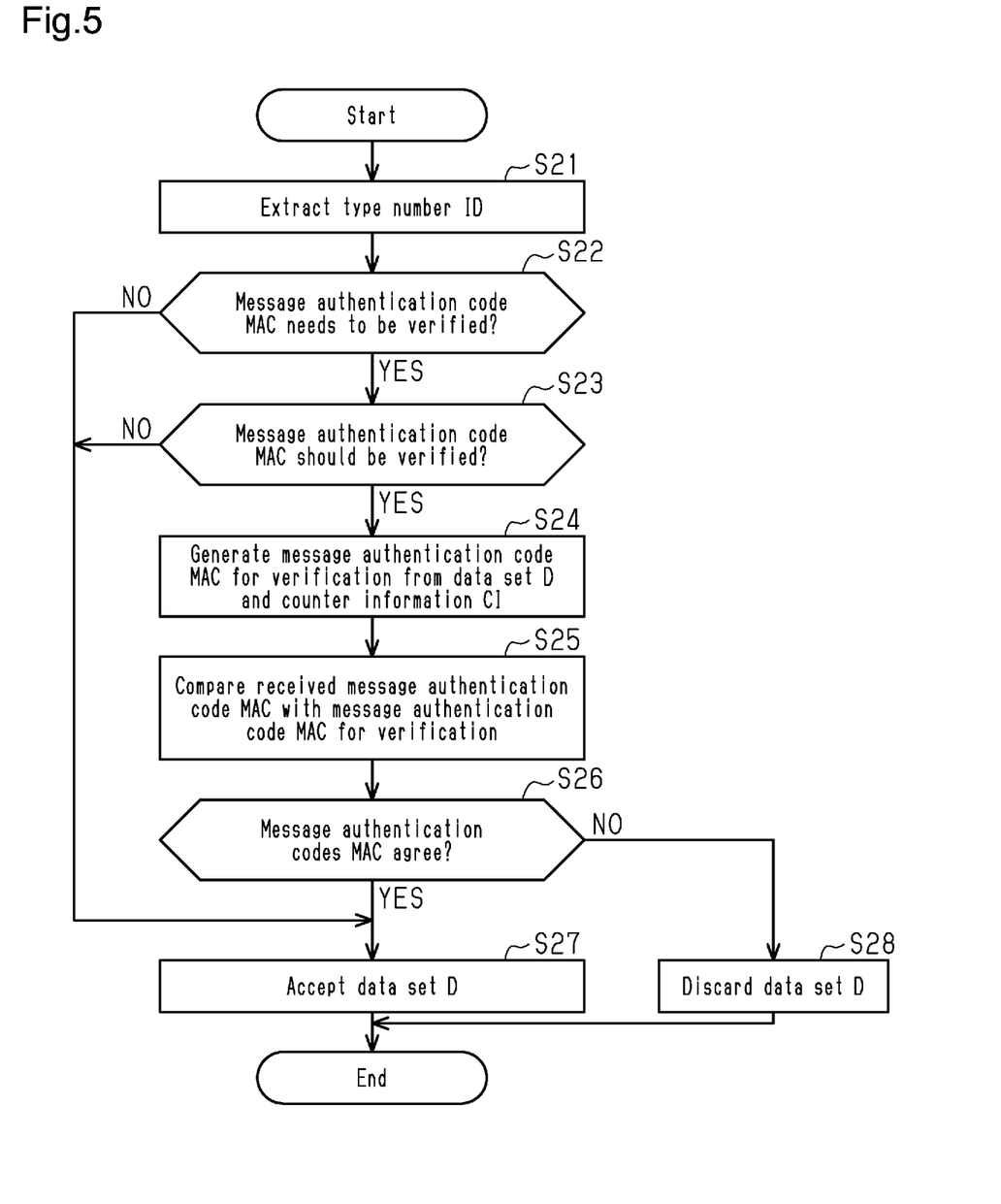
FIG. 5 is a flowchart illustrating a series of processes related to MAC verification by the receiving device in FIG. 3.

As shown in FIG. 5, when the program for verifying MACs is executed, the MAC verifying unit 53 first executes the process of step S21. In step S21, the MAC verifying unit 53 extracts the type number ID of a message MS input from the message receiving unit 52. Subsequently, the MAC verifying unit 53 advances the process to step S22.

In step S22, the MAC verifying unit 53 determines whether the type of the current message MS requires verification of the message authentication code MAC. Specifically, the MAC verifying unit 53 compares the type number ID extracted in step S21 with list data stored in the storage device. The list data indicates whether messages MS need to be verified using message authentication codes MAC. Then, if the list indicated by the list data indicates that the message MS needs to be verified for the type number ID extracted in step S21, the MAC verifying unit 53 determines that verification of the message MS is necessary. If the list indicated by the list data indicates that the message MS does not need to be verified for the type number ID extracted in step S21, the MAC verifying unit 53 determines that verification of the message MS is not necessary. When the MAC verifying unit 53 determines that the message MS needs to be verified (S22: YES), the MAC verifying unit 53 advances the process to step S23.

In step S23, the MAC verifying unit 53 determines whether the current message MS should be verified. Specifically, the MAC verifying unit 53 refers to the code assignment list CL stored in the storage device. Next, the MAC verifying unit 53 determines whether the message MS, received this time, corresponds to the appropriate numbered message MS in the code assignment list CL for which a message authentication code MAC should be assigned. When the determination is affirmative (S23: YES), the MAC verifying unit 53 advances the process to step S24.

In step S24, the MAC verifying unit 53 generates a message authentication code MAC for verification. For example, the MAC verifying unit 53 generates a hash value from the data set D and the counter information CI of the received message MS using a hash function. Then, the MAC verifying unit 53 generates a message authentication code MAC for verification using an encryption algorithm indicated by the cryptographic key from the hash value. Subsequently, the MAC verifying unit 53 advances the process to step S25.

In step S25, the MAC verifying unit 53 compares the two message authentication codes MAC. More specifically, the MAC verifying unit 53 compares the message authentication code MAC included in the received message MS with the message authentication code MAC for verification, which has been generated in step S24. Subsequently, the MAC verifying unit 53 advances the process to step S26.

In step S26, the MAC verifying unit 53 determines whether the two message authentication codes MAC compared in step S25 agree with each other. When the two message authentication codes MAC agree with each other (S26: YES), the MAC verifying unit 53 advances the process to step S27.

In step S27, the MAC verifying unit 53 accepts the data set D included in the message MS. That is, the MAC verifying unit 53 determines that the current message MS is a valid message and accepts the data set D. Then, the MAC verifying unit 53 terminates the current series of processes.

In contrast, when the two message authentication codes MAC compared in step S25 do not agree with each other in step S26 (S26: NO), the MAC verifying unit 53 advances the process to step S28.

In step S28, the MAC verifying unit 53 discards the data set D included in the message MS. That is, the MAC verifying unit 53 determines that the current message MS is not a valid message and discards the data set D. Thereafter, the MAC verifying unit 53 terminates the current series of processes. Thus, the discarded data set D is not used for the subsequent processes executed by the advanced safety ECU 50.

When the MAC verifying unit 53 determines that the message MS does not need to be verified (S22: NO), the MAC verifying unit 53 advances the process to step S27. Also, when the MAC verifying unit 53 determines that now is not the time to verify the message MS (S23: NO), the MAC verifying unit 53 advances the process to step S27. When a negative determination is made in step S22 or when a negative determination is made in step S23, the data set D of the message MS is accepted without verifying the current message MS. Then, the MAC verifying unit 53 terminates the current series of processes.

Determination of Reliability of Data Set

As shown in FIG. 3, the CPU of the receiving device 51 implements the reliability determining unit 54 by executing a program for determining the reliabilities of data sets stored in the ROM. Specifically, the CPU of the receiving device 51 executes the program at a predetermined cycle.

The reliability determining unit 54 calculates reliability parameters RP indicating the reliabilities of all the types of data sets D accepted by the MAC verifying unit 53. That is, the reliability determining unit 54 calculates the reliability parameter RP for each of the first to fourth data sets D1 to D4. The reliability of a data set D indicates the degree of reliability relative to other data sets D. In other words, the reliability of a data set D indicates whether that data set D is valid information in comparison to other data sets D. The reliability of a data set D is reduced when, for example, a sensor or the like cannot detect a correct value due to a failure, or when there are errors in calculations. The reliability of a data set D is also reduced when unintended contents are input to that data set from outside by unauthorized access.

The reliability determining unit 54 calculates reliability parameters RP, which indicate the reliabilities of data sets D, based on the matching rate of a common range of the multiple types of the received data sets D. In the present embodiment, the greater the value of the reliability parameter RP, the higher the reliability becomes. In the following description, determination of the reliabilities of the first to fourth data sets D1 to D4 will be described as an example.

Figure 6:
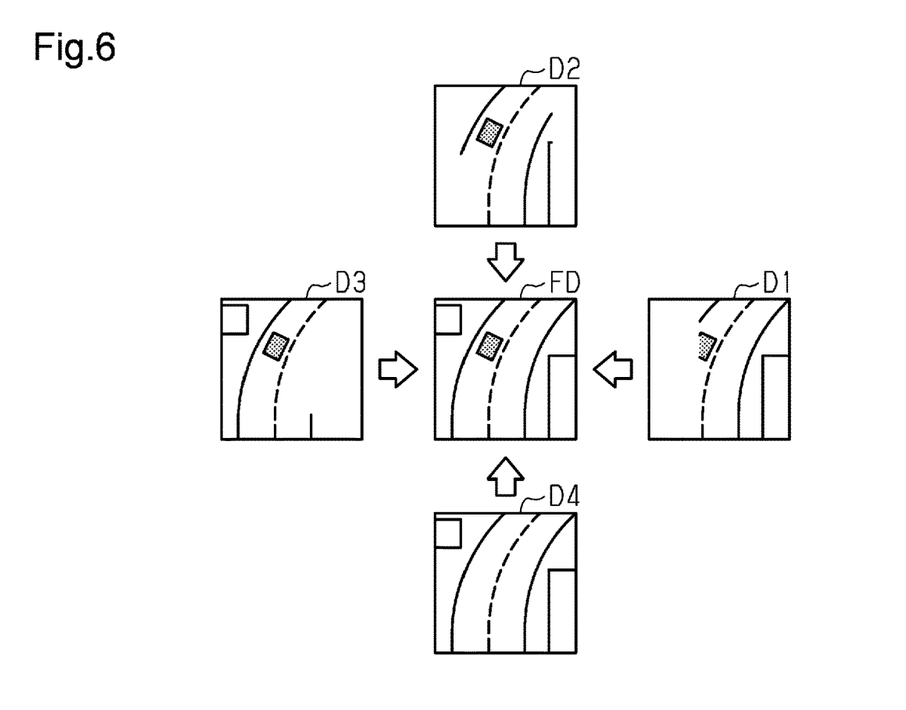
FIG. 6 is an explanatory diagram showing one example of a data set having a high reliability.

As shown in FIG. 6, the reliability determining unit 54 integrates the first to fourth data sets D1 to D4 to generate integrated information FD. Specifically, the images indicated by the first to fourth data sets D1 to D4 are each a part of the images indicated by the integrated information FD. Some areas of the images indicated by the first to fourth data sets D1 to D4 overlap with each other. When the reliabilities of the first to fourth data sets D1 to D4 are all relatively high, the integrated information FD is generated as an image in which the images indicated by the first to fourth data sets D1 to D4 are superimposed on one another.

The reliability determining unit 54 calculates the matching rate of each data set D with respect to the integrated information FD. For example, when calculating the matching rate of the first data set D1, the reliability determining unit 54 compares the first data set D1 with the integrated information FD that is formed by integrating the second to fourth data sets D2 to D4, which are all the data sets D except the first data set D1. The reliability determining unit 54 calculates the matching rate of the image indicated by the integrated information FD at this time and the image indicated by the first data set D1. The reliability determining unit 54 outputs a greater value of the reliability parameter RP for a greater value of the matching rate calculated in this manner.

Figure 7:
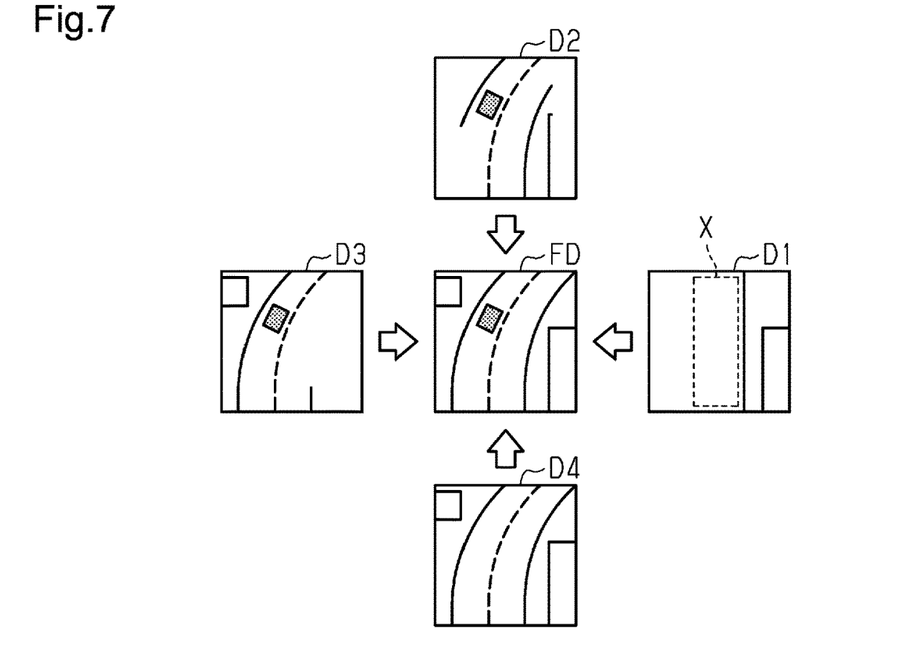
FIG. 7 is an explanatory diagram showing one example of a data set having a low reliability.

For example, FIG. 7 illustrates a case in which the reliabilities of the second to fourth data sets D2 to D4 are relatively high, while the reliability of the first data set D1 is relatively low. Specifically, in this example, the first data set D1 is a data set that, although originally it should be able to generate information related to a particular region X, has failed to generate such information. When calculating the matching rate of the first data set D1, the reliability determining unit 54 compares the first data set D1 with integrated information FD that is formed by integrating the second to fourth data sets D2 to D4. At this time, the reliability determining unit 54 calculates the matching rate of the image indicated by the integrated information FD and the image indicated by the first data set D1. As described above, since the first data set D1 has lost information related to the particular region X, the information related to the particular region X does not agree with the integrated information FD. Thus, the reliability determining unit 54 outputs the reliability parameter RP of the first data set D1 as a relatively small value.

In this manner, the reliability determining unit 54 determines and outputs the reliability parameter RP for each data set D at a predetermined cycle. As shown in FIG. 3, the reliability determining unit 54 stores the reliability parameters RP indicating the reliabilities of the respective data sets D in a storage device. The storage device stores two or more reliability parameters RP including at least the ones determined in the previous cycle and the current cycle. In the present embodiment, the reliability parameters RP are values of the matching rate of images as described above.

Management of Assignment Rates

As shown in FIG. 3, the CPU of the receiving device 51 implements the assignment rate managing unit 55 by executing a program for calculating assignment rates of message authentication codes MAC stored in the ROM. Specifically, each time a reliability parameter RP is calculated, the CPU of the receiving device 51 executes the program.

Figure 8:
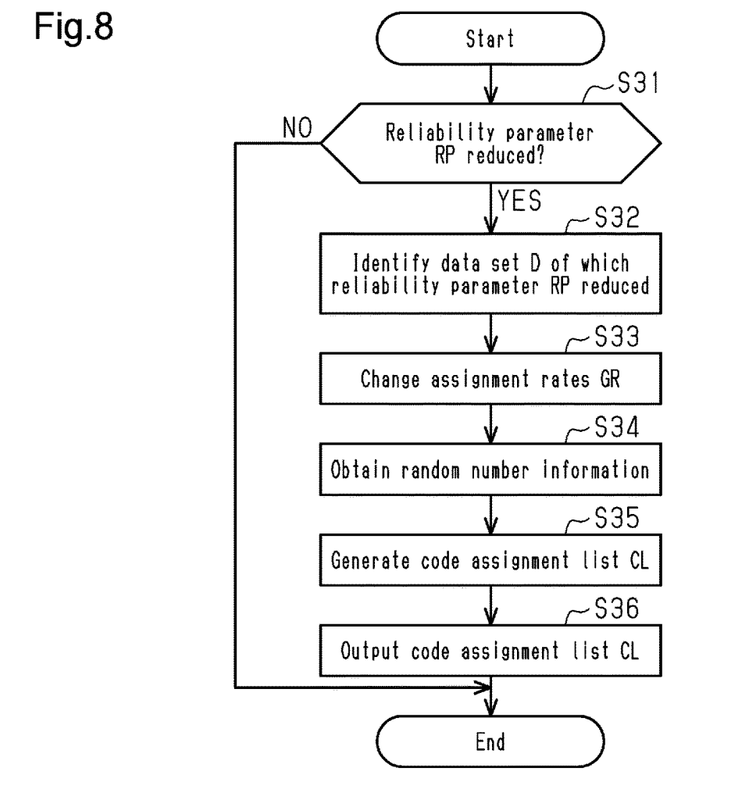
FIG. 8 is a flowchart showing a series of processes related to a MAC assignment rate of the receiving device shown in FIG. 3.

As shown in FIG. 8, when the program for managing assignment rates is executed, the assignment rate managing unit 55 first performs the process of step S31. In step S31, the assignment rate managing unit 55 determines whether the reliability parameter RP of any one of the first to fourth data sets D1 to D4 has been reduced as compared with the previous value. If the current reliability parameter RP is smaller than the previous reliability parameter RP (S31: YES), the assignment rate managing unit 55 advances the process to step S32.

In step S32, the assignment rate managing unit 55 identifies the data set D of which the reliability parameter RP has been reduced. For example, in the example shown in FIG. 7, the first data set D1 is identified as the data set D of which the reliability parameter RP has been reduced. Subsequently, the assignment rate managing unit 55 advances the process to step S33.

In step S33, the assignment rate managing unit 55 changes the assignment rates GR for multiple types of data sets D. Specifically, the assignment rate managing unit 55 first changes the assignment rate GR for the message MS including the data set D of which the reliability parameter RP has been reduced to a value greater than that before the change. Also, the assignment rate managing unit 55 changes the assignment rate GR for a data set D other than the data set D of which the reliability parameter RP has been reduced to a value less than that before the change. That is, the assignment rate managing unit 55 changes the assignment rate GR for at least one the data sets D of which the reliability parameter RP has not been reduced to a value less than that before the change. Specifically, the assignment rate managing unit 55 determines, as the most reliable type of data set D, the data set D of which the latest reliability parameter RP is the highest among all the data sets D excluding the one determined to have the reduced reliability. The assignment rate managing unit 55 defines the most reliable type of data set D as a data set D that reduces the value of the assignment rate GR.

The assignment rate managing unit 55 changes the assignment rates GR for the data sets D that are transmitted from the transmitting devices 41 during a prescribed period such that the assignment rate GR for all the data sets D is constant. Thus, the assignment rate managing unit 55 calculates the assignment rate GR for each data set D based on the frequency of transmission of a data set D of which the assignment rate GR should be reduced and a data set D of which the assignment rate GR should be increased. For example, in some cases, the frequency of transmission of a data set D of which the assignment rate GR should be reduced is lower than the frequency of transmission of a data set D of which the assignment rate GR should be increased. In such a case, the assignment rate managing unit 55 sets the amount of reduction in the assignment rate GR to be greater than the amount of increase in the assignment rate GR. Subsequently, the assignment rate managing unit 55 advances the process to step S34.

In step S34, the assignment rate managing unit 55 obtains random number information indicating random numbers. The random number information is updated to random number information of different contents each time step S34 is executed. Subsequently, the assignment rate managing unit 55 advances the process to step S35.

In step S35, the assignment rate managing unit 55 generates a new code assignment list CL. The code assignment list CL generated at this time is a code assignment list CL corresponding to the type of the data set D of which the assignment rate GR has been changed in step S33. Specifically, the assignment rate managing unit 55 generates a code assignment list CL based on a random number indicated by the random number information obtained in step S34. Therefore, when generating a code assignment list CL, the assignment rate managing unit 55 randomly determines to which data set D of the repeatedly transmitted data sets D the message authentication code MAC is assigned. At this time, the assignment rate managing unit 55 matches the number of data sets D to which the message authentication code MAC should be assigned, to the above-mentioned assignment rate GR, based on a predetermined population of data sets D. Subsequently, the assignment rate managing unit 55 advances the process to step S36.

In step S36, the assignment rate managing unit 55 outputs the code assignment list CL as the information indicating the assignment rates GR to the information transmitting unit 56. Also, the assignment rate managing unit 55 stores the code assignment list CL of the same content in the storage device. The assignment rate managing unit 55 then terminates the series of processes.

In step S31, if the current reliability parameter RP is not less than the previous reliability parameter RP (S31: NO), the assignment rate managing unit 55 terminates the current series of processes. Thus, when making a negative determination in step S31, the assignment rate managing unit 55 does not change the assignment rates GR.

Transmission of Code Assignment List

As shown in FIG. 3, the CPU of the receiving device 51 implements the information transmitting unit 56 by executing a program for transmitting information indicating the assignment rates GR stored in the ROM. Specifically, when an assignment rate GR is changed, the CPU of the receiving device 51 starts executing the program. The information transmitting unit 56 transmits, to the transmitting device 41, the code assignment list CL input from the assignment rate managing unit 55.

In this manner, in the communication system 100, the transmitting device 41 assigns a message authentication code MAC to a message MS based on the code assignment list CL managed by the receiving device 51.

Operation of Embodiment

Figure 9:
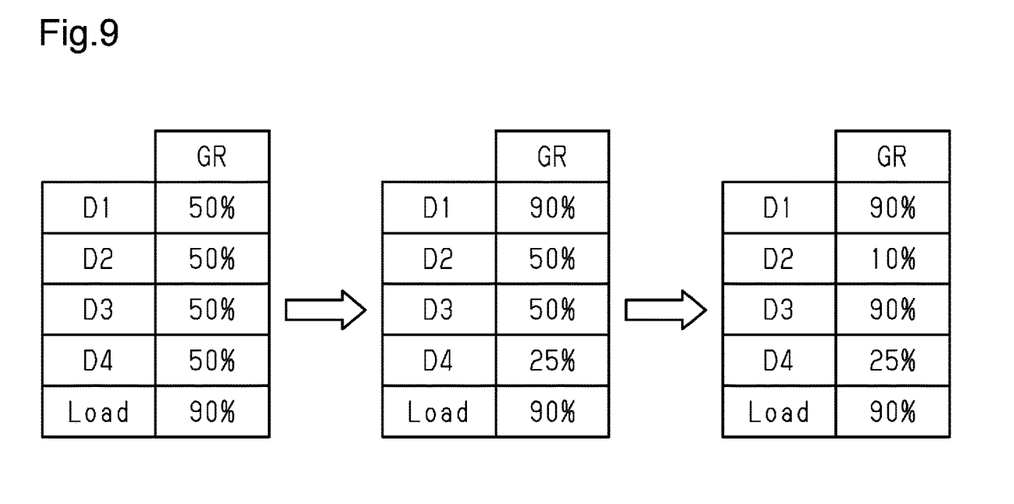
FIG. 9 is an explanatory diagram showing changes in the assignment rate in the process of FIG. 8.

A case according to the above-described embodiment will now be described in which, among the first to fourth data sets D1 to D4, the reliability of the first data set D1 is reduced and then the reliability of the third data set D3 is reduced. The frequencies at which the first to third data sets D1 to D3 are transmitted are the same. The frequency at which the fourth data set D4 is transmitted is higher than the frequency at which the first data set D1 is transmitted.

As shown in FIG. 9, before the reliabilities of the first to fourth data sets D1 to D4 are reduced, the assignment rate managing unit 55 sets all the assignment rates GR for the first to fourth data sets D1 to D4, for example, to 50%.

Then, among the reliabilities of the first to fourth data sets D1 to D4, the reliability of the first data set D1 is reduced. At this time, the assignment rate managing unit 55 sets the assignment rate GR for the first data set D1 to 90%, which is greater than 50% (the value before the change). Also, the assignment rate managing unit 55 sets the assignment rate GR for the fourth data set D4 to 25%, which is less than 50% (the value before the change). At this time, the assignment rate managing unit 55 reduces the assignment rate GR for the fourth data set D4 by a smaller amount than the amount by which the assignment rate managing 55 increases the assignment rate GR for the first data set D1. In this case, since the frequency at which the fourth data set D4 is transmitted is higher than the frequency at which the first data set D1 is transmitted, the assignment rate GR for all the data sets D transmitted from the transmitting device group 41G during the prescribed period is constant. As a result, the load on the transmitting device group 41G during the prescribed period is constant 90% before and after the assignment rates GR for the first and fourth data sets D1, D4 are changed.

Next, a case will be described in which, among the reliabilities of the first to fourth data sets D1 to D4, the reliability of the third data set D3 is lowered. At this time, the assignment rate managing unit 55 sets the assignment rate GR for the third data set D3 to 90%, which is greater than 50% (the value before the change). Also, the assignment rate managing unit 55 sets the assignment rate GR for the second data set D2 to 10%, which is less than 50% (the value before the change). At this time, the assignment rate managing unit 55 increases the assignment rate GR for the third data set D3 by the same amount as the amount by which the assignment rate managing 55 reduces the assignment rate GR for the second data set D2. In this case, since the frequency at which the third data set D3 is transmitted is equal to the frequency at which the second data set D2 is transmitted, the assignment rate GR for all the data sets D transmitted from the transmitting device group 41G during the prescribed period is constant. As a result, the load on the transmitting device group 41G during the prescribed period is constant 90% before and after the assignment rates GR for the second and third data sets D2, D3 are changed.

Advantages of Embodiment (1) In the above-described embodiment, when determining that the reliability of the first data set D1 has been reduced, the assignment rate managing unit 55 changes the assignment rate GR for the first data set D1 to a value greater than that before the change. At this time, the assignment rate managing unit 55 of the receiving device 51 changes the assignment rate GR for the data set D, which is different from the first data set D1, for example, the second data set D2, to a value less than that before the change. As a result, the message authentication code MAC is more frequently assigned to the first data set D1, of which the reliability has been determined to be reduced. This prevents the receiving device 51 from being affected by an improper data set D when receiving the first data set D1. An increase in the assignment rate GR for the first data set D1 may increase the processing load related to the message authentication codes MAC on the transmitting device group 41G and the receiving device 51. In this regard, the frequency at which the message authentication code MAC is generated for the second data set D2 is lowered. This prevents the processing load related to the message authentication codes MAC on the transmitting device group 41G and the receiving device 51 from being excessively increased.

(2) In the above-described embodiment, the assignment rate managing unit 55 changes the assignment rate GR for each of the data sets D transmitted from the transmitting device group 41G during the prescribed period such that the assignment rate GR for all the data sets D is constant. This maintains the total processing load related to the message authentication codes MAC on the transmitting device group 41G and the receiving device 51 at a constant value before and after the assignment rate managing unit 55 changes the assignment rates GR. Thus, the total processing load will not be increased by changing the assignment rates GR by the assignment rate managing unit 55.

(3) In the above-described embodiment, when generating the code assignment list CL, the assignment rate managing unit 55 randomly determines, using random number information, which data set D will be assigned a message authentication code MAC. Thus, it is difficult to predict from the outside which data set D should be assigned a message authentication code MAC. This makes it difficult to disguise a data set D from the outside as if it were a data set D with a correct message authentication code MAC.

(4) In the above-described embodiment, when changing the assignment rates GR, the assignment rate managing unit 55 selects the most reliable type of data set D from all the data sets D except for the data set D of which the assignment rate GR will be increased. The assignment rate managing unit 55 then reduces the assignment rate GR of the selected data set D. When the assignment rate GR is reduced, the possibility of receiving an improper data set D increases. However, since a highly reliable type of data set D is selected as the data set D of which the assignment rate GR will be reduced, the possibility of receiving an improper data set D will be reduced.

(5) In the above-described embodiment, the transmitting device group 41G includes multiple transmitting devices 41. Thus, the processing load on each transmitting device 41 can be set in accordance with the capacity of each transmitting device 41. However, as the processing load on each transmitting device 41 increases, the processing load on the entire transmitting device group 41G increases. In the above-described embodiment, the processing load related to the message authentication codes MAC on the receiving device 51 is substantially equal to the processing load related to the message authentication codes MAC on the whole transmitting device group 41G. Thus, when the assignment rate GR for a data set D is increased, the processing load on the receiving device 51 is likely to become excessive. Thus, the use of the assignment rate managing unit 55 of the above-described embodiment is particularly suitable for limiting an increase in the processing load on the receiving device 51.

OTHER EMBODIMENTS

The above-described embodiment may be modified as follows. The above-described embodiment and the following modifications can be combined as long as the combined modifications remain technically consistent with each other.

The ECUs that include the transmitting devices 41 and the receiving device 51 are not limited to the examples in the above-described embodiment. For example, the advanced safety ECU 50 may include a transmitting device 41, and the brake ECU 80 may include a receiving device 51. For example, when data sets D are transmitted between the sensor ECU 40 and the engine ECU 60, the sensor ECU 40 may include a transmitting device 41, and the engine ECU 60 may include a receiving device 51.

Each transmitting device 41 is not limited to one that transmits one type of data set D to the receiving device 51. For example, each transmitting device 41 may transmit the first data set D1 and the second data set D2 as the data sets D. In this case, if the assignment rate GR for the first data set D1 and the assignment rate GR for the second data set D2 are changed to relatively great values, the processing load on the transmitting device 41 will be increased. Thus, the configuration of the assignment rate managing unit 55 is suitable for limiting an increase in the processing load on each transmitting device 41.

The transmitting device group 41G may include a single transmitting device 41. In this case, as described above, the single transmitting device 41 may transmit multiple types of data sets D. For example, when the vehicle 10 includes an ECU that centrally controls multiple sensors, the ECU may include such a transmitting device 41.

When the transmitting device 41 needs to generate the message authentication codes MAC for all types of data sets D, the MAC generating unit 43 may omit the process of step S12.

In the transmitting device 41, the method by which the MAC generating unit 43 generates message authentication codes MAC is not limited to the process of step S14. For example, the MAC generating unit 43 may use a block cipher algorithm instead of a hash function.

In the transmitting device 41, the relationship between the functional units and the programs used to implement the functional units is not limited to the example in the above-described embodiment. For example, the message body generating unit 42 and the MAC generating unit 43 may be implemented by the transmitting device 41 executing a program for generating messages.

Each transmitting device 41 may be circuitry including: 1) one or more processors that perform various processes according to computer programs (software), 2) one or more dedicated hardware circuits such as application specific integrated circuits (ASIC) that execute at least part of various processes, or 3) a combination thereof. The processor includes a CPU and a memory such as a RAM and a ROM. The memory stores program codes or instructions configured to cause the CPU to execute processes. Memory, or computer-readable media, includes any available media that can be accessed by a general purpose or special purpose computer. The same applies to the receiving device 51.

When the receiving device 51 needs to perform authentication of messages for all the types of data sets D, the MAC verifying unit 53 may omit the process of step S22.

In the receiving device 51, the method by which the MAC verifying unit 53 generates message authentication codes MAC is not limited to the process of step S24. The process by which the MAC verifying unit 53 generates message authentication codes MAC may be changed in the same manner as the MAC generating unit 43.

In the receiving device 51, the method by which the reliability determining unit 54 calculates reliability parameters RP is not limited to the example in the above-described embodiment. For example, in the example shown in FIG. 10, the receiving device 51 obtains, as data sets D, a first data set D11, a second data set D12, and a third data set D13. The first data set D11 represents the trajectory of a first separate vehicle, different from the vehicle 10, at a specific location, including a road. The second data set D12 represents the trajectory of a second separate vehicle, different from the vehicle 10, at the same specific location, including the road. The third data set D13 represents a predicted trajectory through which the vehicle 10 will pass at the same specific location including the road. The first data set D11 and the second data set D12 are, for example, received by the sensor ECU 40 from external devices through wireless communication. The third data set D13 is received by the sensor ECU 40 from, for example, an image generating application. The image generating application generates the third data set D13 using the steered angle of the vehicle 10, a map image, and the like. When determining the reliability of a data set D representing the trajectory of a vehicle, the reliability determining unit 54 may obtain a reliability parameter RP in the following manner. First, the reliability determining unit 54 determines whether data sets D the number of which is greater than or equal to a predetermined number represent trajectories avoiding an obstacle at a specific location. In the example shown in FIG. 10, the reliability determining unit 54 determines that data sets D, the number of which is greater than or equal to the predetermined number, represent trajectories avoiding an obstacle at a specific location based on the first data set D11 and the second data set D12. Next, the reliability determining unit 54 determines whether the third data set D13, which represents a predicted trajectory of the vehicle 10, represents a predicted trajectory avoiding the obstacle at the specific location. In the example shown in FIG. 10, the reliability determining unit 54 determines that the amount by which the obstacle will be avoided in the third data set D13 is larger than that in the second data set D12, in which the amount by which the obstacle was avoided is smallest, and is smaller than that in the first data set D11, in which the amount by which the obstacle was avoided is largest. At this time, the reliability determining unit 54 determines that the third data set D13 is a data set D for properly avoiding the obstacle. In this case, the reliability determining unit 54 determines that the third data set D13 is a highly reliable data set D. The reliability determining unit 54 outputs a reliability parameter RP indicating a relatively high reliability.

Figure 10:
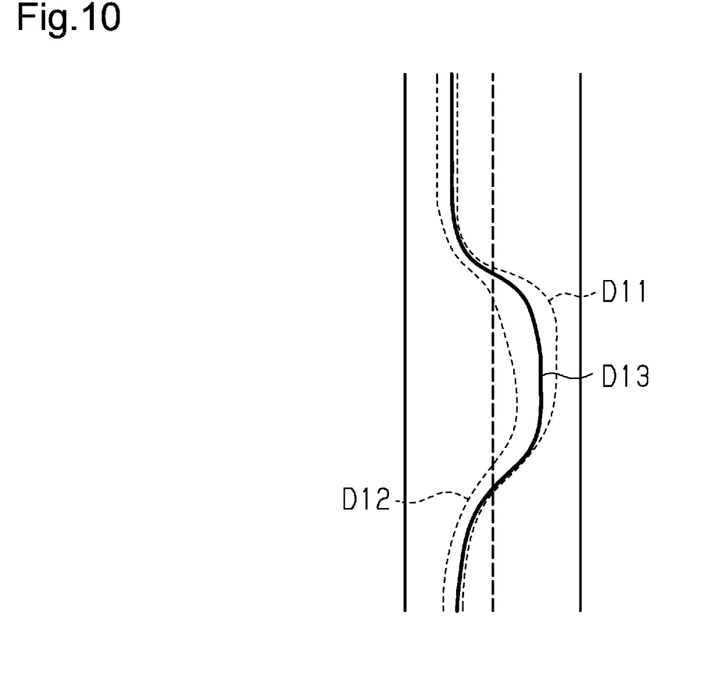
FIG. 10 is an explanatory diagram showing another example of a data set having a high reliability.
Figure 11:
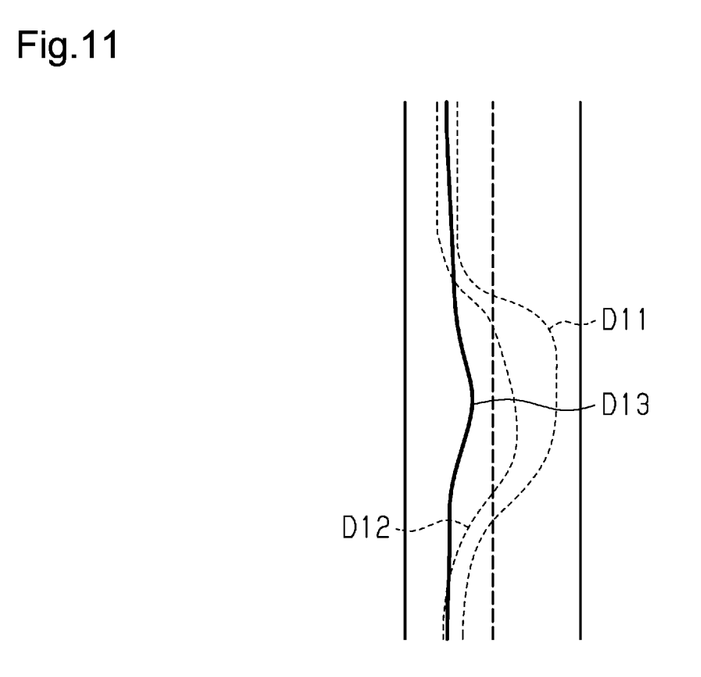
FIG. 11 is an explanatory diagram showing another example of a data set having a low reliability.

In the example shown in FIG. 11, the reliability determining unit 54 determines that data sets D the number of which is greater than or equal to the predetermined number represent trajectories avoiding an obstacle at a specific location based on the first data set D11 and the second data set D12, as in the example of FIG. 10. However, the reliability determining unit 54 determines that the amount by which the obstacle will be avoided in the third data set D13 is smaller than that in the second data set D12, in which the amount by which the obstacle was avoided is smallest. Thus, the reliability determining unit 54 determines that the third data set D13 is not a data set D for properly avoiding the obstacle. In this case, the reliability determining unit 54 determines that the third data set D13 is not a highly reliable data set D. The reliability determining unit 54 outputs a reliability parameter RP indicating a relatively low reliability.

In this manner, the reliability of a data set D is calculated appropriately in accordance with, for example, the type of the data set D. A reliability may be calculated by various methods that use, for example, the degree of matching of data sets D of different types, the degree of deviation of a data set D from a predicted value, or the relationship between the value indicated by a data set D and a predetermined threshold.

In the above-described embodiment, the reliability determining unit 54 outputs reliability parameters RP. Based on the reliability parameters RP, the assignment rate managing unit 55 determines whether the reliability of each data set D has been reduced. However, the present disclosure is not limited to this. The reliability determining unit 54 may determine whether the reliability of each data set D has been reduced. In this case, in step S31, as long as the assignment rate managing unit 55 obtains information indicating that the reliability of a data set D has been reduced from the reliability determining unit 54, the assignment rate managing unit 55 advances the process to step S32, assuming that the reliability of the data set D has been reduced.

In the above-described embodiment, the assignment rate managing unit 55 compares the current reliability parameter RP with the previous reliability parameter RP in step S31 to determine whether the reliability has been reduced. However, information to be used in such comparison is not limited to the information in the previous cycle. The assignment rate managing unit 55 may simply determine whether reliability has been reduced by comparing information obtained in the current cycle and information obtained in the past.

When changing the assignment rates GR, the assignment rate managing unit 55 does not necessarily need to cause the assignment rate GR for the all the data sets D transmitted from the transmitting devices 41 during the prescribed period to be constant. The assignment rate managing unit 55 may simply set, for example, the assignment rate GR for the first data set D1 having a reduced reliability to a value larger than that before the change, and set the assignment rate GR for the second data set D2, which differs from the first data set D1, to a value smaller than that before the change.

When generating the code assignment list CL, the assignment rate managing unit 55 may randomly determine, without using random number information, which one of the data sets D transmitted during the prescribed period will be assigned the message authentication code MAC.

The assignment rate managing unit 55 does not necessarily need to change the time at which message authentication codes MAC are assigned after changing the assignment rates GR. In this case, the assignment rate managing unit 55 does not necessarily need to generate the code assignment list CL. The assignment rate managing unit 55 may assign message authentication codes MAC to messages MS at a predetermined fixed frequency. For example, the assignment rate managing unit 55 may be configured to assign the message authentication code MAC at regular intervals during the prescribed period, regardless of the assignment rate GR. In this case, the assignment rate managing unit 55 simply needs to output only information indicating the assignment rate GR to the information transmitting unit 56.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A communication system, comprising:
   a transmitting device group that includes one or more transmitting devices configured to repeatedly transmit data sets; and
   a receiving device configured to receive multiple types of data sets, the receiving device comprising a first processor and a first memory storing non-transitory computer executable instructions, wherein
   the receiving device is configured to execute the stored instructions to:
   receive the data sets transmitted from the one or more transmitting devices,
   determine reliabilities of the received data sets,
   manage assignment rates of message authentication codes for the data sets, the assignment rates being determined for respective types of the data sets, and
   transmit information indicating the assignment rates,
   the transmitting device group comprises a second processor and a second memory storing non-transitory computer executable instructions, and the transmitting device group is configured to execute the stored instructions to:
   receive the information indicating the assignment rates,
   generate, for each of the types of the data sets, the message authentication code at the assignment rate corresponding to each of the types of the data sets, and
   transmit the data sets after assigning the generated message authentication codes to the data sets at the assignment rates corresponding to the types of the data sets,
   the data sets include a first data set and a second data set that is of a different type from the first data set, and
   the receiving device is configured to execute stored instructions to change, when it is determined that the reliability of the first data set has been reduced, the assignment rate for the first data set to a value greater than that before the change and change the assignment rate for the second data set to a value less than that before the change.

2. The communication system according to claim 1, wherein the receiving device is configured to execute stored instructions to change the assignment rates for the first data set and the second data set such that the assignment rate for all the data sets transmitted from the transmitting device group during a prescribed period is constant.

3. The communication system according to claim 1, wherein the receiving device is configured to execute stored instructions to generate a code assignment list that indicates to which data set of the data sets, repeatedly transmitted from the one or more transmitting devices, the message authentication code should be assigned, and transmit the code assignment list as the information indicating the assignment rates, and the receiving device is configured to execute stored instructions to randomly determine to which data set the message authentication code should be assigned when generating the code assignment list.

4. The communication system according to claim 1, wherein the receiving device is configured to execute stored instructions to determine the reliabilities of all the types of the received data sets, and define, as the second data set, the data set of a type having a highest reliability among all the data sets except the first data set.

5. The communication system according to claim 1, wherein the transmitting device group includes multiple transmitting devices, the transmitting devices including a first transmitting device and a second transmitting device that is different from the first transmitting device, the first transmitting device is configured to execute stored instructions to transmit the first data set, and the second transmitting device is configured to execute stored instructions to transmit the second data set.

6. The communication system according to claim 1, wherein one of the transmitting devices is configured to execute stored instructions to transmit the first data set and the second data set.

7. A receiving device comprising a processor and a memory storing non-transitory computer executable instructions, the receiving device configured to execute stored instructions to receive multiple types of data sets from a transmitting device group that includes one or more transmitting devices configured to repeatedly transmit data sets, the receiving device being configured to execute stored instructions to:

receive the data sets transmitted from the one or more transmitting devices, determine reliabilities of the received data sets, manage assignment rates of message authentication codes for the data sets, the assignment rates being determined for respective types of the data sets, and transmit information indicating the assignment rates, wherein the data sets include a first data set and a second data set that is of a different type from the first data set, and the receiving device is configured to execute stored instructions to change, when it is determined that the reliability of the first data set has been reduced, the assignment rate for the first data set to a value greater than that before the change and change the assignment rate for the second data set to a value less than that before the change.

* * * * *